United States Patent [19]
Yoshimura et al.

[11] Patent Number: 6,010,793
[45] Date of Patent: Jan. 4, 2000

[54] WOOD BOARD, SURFACE-DECORATED WOOD BOARD, AND MANUFACTURING METHOD THEREFOR

[75] Inventors: Katsuji Yoshimura; Hironao Nagasima, both of Hamamatsu, Japan

[73] Assignee: Yamaha Corporation, Japan

[21] Appl. No.: 08/707,090

[22] Filed: Sep. 3, 1996

Related U.S. Application Data

[63] Continuation of application No. 08/341,666, Nov. 17, 1994, abandoned.

[30] Foreign Application Priority Data

Nov. 22, 1993 [JP] Japan .................................. 5-292204

[51] Int. Cl.⁷ ...................................................... B32B 21/04
[52] U.S. Cl. ...................... 428/537.1; 428/106; 428/107; 428/425.1; 428/910; 428/921; 427/207.1; 427/208.2; 427/384; 427/393
[58] Field of Search .................................... 428/106, 107, 428/425.1, 537.1, 910, 921; 427/207.1, 208.2, 384, 393

[56] References Cited

U.S. PATENT DOCUMENTS

| | | | |
|---|---|---|---|
| 4,364,984 | 12/1982 | Wentworth | 428/106 |
| 4,897,291 | 1/1990 | Kim | 427/393 |
| 5,365,705 | 11/1994 | Crowley et al. | 52/90.1 |
| 5,443,894 | 8/1995 | Pollock et al. | 428/213 |

FOREIGN PATENT DOCUMENTS

| | | |
|---|---|---|
| 50-132107 | 10/1975 | Japan . |
| 455083 | 9/1992 | Japan . |
| 564769 | 3/1993 | Japan . |

*Primary Examiner*—Leszek Kiliman
*Attorney, Agent, or Firm*—Ostrolenk, Faber, Gerb & Soffen, LLP

[57] ABSTRACT

A wood board 1, wherein irregularities 6 of the surface of an oriented strand board 2 in a laminated wood board 5, in which an oriented strand board 2 is laminated on a strand board 3, are filled with a putty 7, and smoothed. A surface-decorated wood board 10, in which a surface-decorative material 12 is applied to a smoothed surface of this wood board 1. Despite the fact that an oriented strand board 2 having large surface irregularities is employed as the surface layer, it is possible to obtain a wood board 1 which has a smooth surface, in which the wooden strand pattern is reduced, and which has superior water and moisture resistance.

6 Claims, 1 Drawing Sheet

WOOD BOARD, SURFACE-DECORATED WOOD BOARD, AND MANUFACTURING METHOD THEREFOR

This is a Continuation of Application Ser. No. 08/341,666 filed on Nov. 17, 1994 now abandoned.

BACKGROUND OF THE INVENTION

1. Field of the Invention

The present invention relates to a wood board, a surface-decorated wood board, and a manufacturing method therefor, and in particular relates to wood boards, in which the surface of an oriented strand board in a laminated wood board, in which an oriented strand board is laminated to a strand board, has improved smoothness, and improved resistance to water and moisture, as well as to a manufacturing method therefor, and additionally, to a surface-decorated wood board which employs this wood board.

2. Background Art

In recent years, the felling of forests has been restricted, and it has become difficult to obtain lumber resources, and in connection therewith, the supply of plywood and the like which consumes large amounts of lumber resources has become uncertain, and furthermore, the price thereof has tended to rise, so that a substitute product has been in demand. From this point of view, oriented strand boards which can be produced from waste materials and which, moreover, possess strength which is comparable to that of plywood produced from coniferous trees or broadleaf trees, have attracted attention.

Oriented strand boards, which may be abbreviated to "OSB", are wood boards in which thin wooden strands having a thickness within a range of 0.2~2 mm are arranged in essentially a single direction, are collected so that the direction of the ligneous fibers thereof is essentially identical, and these are then molded into an integral structure by means of a binder such a s a phenol resin or the like; such boards have come to be employed as roofs, walls, floors, or foundation materials for dwellings.

However, such oriented strand boards are produced by collecting comparatively thick wooden strands, generally having a thickness of 0.8 mm, so that the surface irregularities thereof are severe, and furthermore, the characteristic wooden strand pattern appears, and it is generally difficult to employ such boards as surface layer materials. Furthermore, even if a decorative veneer or a decorative polyvinyl chloride sheet or the like is applied to the surface of such an oriented strand board as a decorative material, large irregularities are present in the surface, so that spaces are formed in the cavities thereof and adhesion is insufficient, and furthermore, the texture appears in the surface of the decorative material, so that various procedures are necessary, such as the smoothing of the surface by sanding, before such an application. Furthermore, even if such procedures are carried out, if the surface decorative material is thin, the wooden strand pattern will be visible through the surface, so that there are problems in that the design thereof is adversely affected. In addition, oriented strand boards generally tend to absorb moisture easily, so that in atmospheres of high humidity, when the oriented strand board absorbs moisture, the dimensional differences between the oriented strand board and the surface decorative material become large, and there is a danger that twisting, peeling, or the like will occur, and furthermore, the surface irregularities may be increased.

For this reason, conventionally, a three-layered structure was employed using an oriented strand board as a core layer, and laminating, for example, medium fiber board having superior surface smoothness to both surfaces thereof. Therefore, even though the oriented strand board was advantageous in terms of the resources consumed, the surface irregularities and the wooden strand pattern thereof hindered the broader use of such oriented strand boards.

SUMMARY OF THE INVENTION

The present invention solves the problems described above; accordingly, it has as an object thereof to provide a wood board which employs oriented strand boards as surface layers thereof, and which, moreover, has a surface having superior smoothness and resistance to water and moisture, as well as to provide a surface-decorated wood board in which a surface-decorative material is applied to a surface thereof, and since the surface is smooth, the wooden strand pattern does not appear through the surface decorative material.

This object can be accomplished by providing a wood board in which the irregularities of the surface of the oriented strand board in a laminated wood board, in which an oriented strand board is laminated on at least one surface of a strand board, are filled with putty, and thus smoothed.

Such a wood board can be produced by filling with putty, and thus smoothing, surface irregularities of an oriented strand board in a laminated wood board, in which an oriented strand board is laminated on a strand board. At this time, it is preferable that the surface irregularities of the oriented strand board be filled with putty and smoothed after being sanded.

The wood board described above can be made into a surface-decorated wood board by means of the application of a surface-decorative material to the smoothed surface thereof.

When the surface irregularities of the oriented strand board are filled with putty and smoothed, this surface is covered with a coating film of putty. By means of this, the surface is not merely smooth, but the coating film of putty forms a water- and moisture-resistant film, hindering the seepage of moisture into the oriented strand board, so that it is possible to prevent warping and twisting.

Furthermore, the surface which has been smoothed by means of the coating film of putty has highly satisfactory adhesion with the surface decorative material. Furthermore, as the coating film of putty does not allow the passage of light, the appearance of the wooden strand pattern in the surface of the surface-decorative material is prevented.

In the wood board in accordance with the present invention, the surface irregularities of the oriented strand board in a laminated wood board, in which an oriented strand board is laminated on at least one surface of a strand board, are filled with putty and thus smoothed, so that despite the fact that an oriented strand board is employed which has surface irregularities, the surface of the wood board is smooth, the wooden strand pattern is reduced, and moreover, the wood board has superior water and moisture resistance.

In the manufacturing method of the wood board of the present invention, the surface irregularities of the oriented strand board in a laminated wood board, in which an oriented strand board is laminated on a strand board, are filled with putty, and thus smoothed, so that the putty fills the cavities in the surface without creating spaces, and the putty surface is continually smoothed.

In the surface-decorated wood board in accordance with the present invention, a surface-decorative material is applied to the putty surface of the wood board, so that despite the fact that an oriented strand board is provided under the surface-decorative material, the surface of the surface-decorative material is smooth, the wooden strand pattern does not appear in the surface, and the adhesion is satisfactory, so that peeling or swelling do not occur, and the water and moisture resistance is superior.

DETAILED DESCRIPTION OF THE PREFERRED EMBODIMENTS

Figure 1:
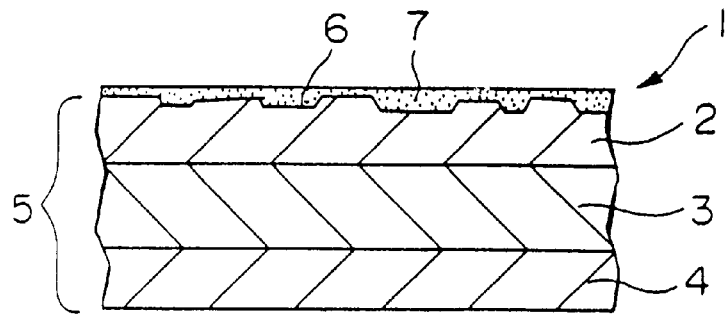
FIG. 1 is a cross sectional view of a wood board in accordance with Example 1.

Hereinbelow, the present invention will be explained in detail.

The putty which is employed in the present invention is, fundamentally, a composition containing powdered filler and a spreader, and is in the form of a paste or is clay-like; after application, when dried, the putty hardens to form a coating film. A wide range of powdered fillers may be employed, such as organic types, inorganic types, or the like. Examples thereof include, for example, calcium carbonate, zinc oxide, baryta powder, talc, titanium oxide, lithopone, white lead, and the like, or mixtures of such powders. Among these, calcium carbonate powder, also termed "chalk", is a particularly preferable powdered filler, in light of its filling property, fluidity, price, and availability. Furthermore, hardened oil, various varnishes, adhesive synthetic resin compositions, or the like may be used as the spreader in an aqueous solution, an organic solvent solution, an emulsion, a suspension, or the like, or may be used without a solvent. In particular, aqueous polymeric isocyanate-type adhesives are particularly preferable spreaders, as the adhesion thereof is satisfactory, and as they form a coating film which has water and moisture resistance and is flexible.

The amount of powdered filler which is employed with respect to the spreader is not particularly restricted; however, in consideration of the workability and the post-curing shrinkage, it is preferable that the powdered filler be present in an amount within a range of 10~50 weight percent of the solid component of the putty.

The amount of putty which is applied to the irregular surface of the oriented strand board is dependent on the degree of irregularity of the surface, so that this amount cannot be standardized. Generally, an amount which is sufficient to fill minute spaces in the cavities, and, in consideration of shrinkage, to form a thin coating film to the height of the projections, is sufficient. This amount is, normally, preferably within a range of approximately 30~200 g/m².

In the laminated wood board which is used in the wood board or the surface-decorated wood board in accordance with the present invention, an oriented strand board is laminated on at least one surface of a strand board. In the oriented strand board forming the surface layer, the wooden strands are collected so that the directions of the ligneous fibers thereof are oriented in essentially a single direction, and these are subjected to compression adhesion using a binder and molded into an integral structure. Thin strands of Japanese red pine, larch, silver fir, fir, aspen, lodgepole pine, or the like are preferable for use as the wooden strands; however, no particular restriction is made with respect to the type of tree. No particular restriction is made with respect to the size and shape of the wooden strands; however, the size of the greater part of the strands should be such that the thickness is within a range of 0.2~0.8 mm, the length is within a range of 20~100 mm, and the width is within a range of 2~60 mm, and those in the shapes of strips which are long in the direction of the ligneous fibers are preferable. In such a case, it is easy to collect the wooden strands so that the direction of the ligneous fibers thereof is essentially identical, and the flexural strength in the direction of the fibers is increased.

In particular, an oriented strand board in which the structure is made minute and the irregularities are reduced as much as possible, and in order to reduce the amount of putty used, wooden strands having a thickness of 0.3 mm or less are employed (hereinbelow, termed a "surface-smoothed oriented strand board") is preferable for use as the oriented strand board forming the surface layer of the wood board in accordance with the present invention. Furthermore, it is preferable that the wooden strands be acetylated in order to improve the water and moisture resistance and the dimensional stability thereof.

In the strand board forming the core layer of the laminated wood board, wooden strands are collected in unspecified directions, or in an oriented manner, then subjected to compression adhesion using a binder and molded so as to become integral. Wooden strands which are similar to those used in the oriented strand board described above may be employed. No particular restriction is made with respect to the size or shape of the wooden strands; however, in order to guarantee the strength of the laminated wood board and to reduce the weight thereof, it is preferable that the majority of the wooden strands be of a size such that the thickness thereof is within a range of 0.4~0.8 mm, the length thereof is within a range of 20~100 mm, and the width thereof is within a range of 2~60 mm, and those in the shapes of strips which are long in the direction of the ligneous fibers are preferable. Furthermore, it is preferable that the strand board forming the core layer have an oriented direction of the wooden strands which is perpendicular to that of the oriented strand boards forming the surface layers. In the present application, the term "strand board" includes boards which are oriented and those which are not oriented, and thus has a wider meaning.

Furthermore, the wooden strands may be acetylated in order to improve water and moisture resistance and dimensional stability.

A freely selected synthetic resin adhesive which is used in the field may be employed as the binder which is used for the compression adhesion of the wooden strands, in the case of both the oriented strand board and the strand board. For example, a phenol resin, a urea resin, a melamine resin, an epoxy resin, or a non-foaming urethane resin, or mixtures thereof, may be employed. Furthermore, it is also possible to use a foaming binder which enables the realization of the appropriate degree of elasticity and a light weight. What is meant here by a "foaming binder" is a binder which securely adheres the wooden strands to one another and which itself creates foam; as a result of this foam, the resin component penetrates into minute gaps in the wooden strands, and is capable of obtaining a large adhesion surface with a small amount of binder, and it is also capable of reducing the density of the collected body.

This foaming binder may comprise self-foaming resin, or may comprise a non-foaming resin and a foaming agent.

Examples of self-foaming resin include foaming polyurethane resin and the like. Examples of non-foaming resins which are made to foam using a foaming agent include, for example, a polyurethane resin, a polystyrene resin, an epoxy resin, a polyvinyl chloride resin, a phenol resin, a urea resin, or mixtures thereof. Furthermore, examples of the foaming agent include volatile foaming agents, for example, $CCl_3F$, $CCl_2F_2$, $CCl_2F—CClF_2$, and the like, or pyrolytic foaming agents, for example, azodicarbonamide, azohexahydrobenzonitrile, 2,2'-azoisobutyronitrile, benzenesulfonohydrazide, N,N'-dinitroso-N,N'-dimethylterephthalamide, or the like.

Furthermore, these foaming binders may contain a non-foaming binder such as a urea resin, a melamine resin, a phenol resin, or the like. It is possible to appropriately adjust the mixing ratio in accordance with the use of the wood board or the surface-decorated wood board, or in accordance with the desired strength or density or the like of the oriented strand board and/or the strand board.

In particular, in the case in which the wood board in accordance with the present invention is used as a flooring material, a degree of hardness is required in the surface of the oriented strand board forming the surface layer, so that the use of a non-foaming binder or a binder mixture containing non-foaming binder in larger amounts is preferable.

The proportions of the binder with respect to the wooden strands should preferably be such that the strands are present in an amount within a range of 10~30 parts per weight with respect to 100 parts per weight of the wooden strands. When the amount is less than 10 parts per weight, the wooden strands cannot be caused to adhere sufficiently, while when the amount thereof is in excess of 30 parts per weight, the density becomes too great, the board becomes heavy, and the impression of wood is lost.

When an oriented strand board or a strand board is produced, first, the wooden strands and the binder are mixed so that the binder is uniformly deposited on the surfaces of the wooden strands. Then, this mixture is collected so that the directions of the ligneous fibers of the wooden strands are oriented in essentially a single direction in the case of an oriented strand board. In the case of a strand board, the mixture is collected so that the directions of the ligneous fibers of the wooden strands are not oriented. If the wooden strands are in the shapes of strips which are long in the direction of the ligneous fibers thereof, it is a simple matter to achieve this orientation by collecting the wooden strands in the direction of the length thereof.

This collected body is subjected to thermal compression and caused to adhere, and is molded into an integral board-shaped structure to obtain an oriented strand board or a strand board.

In manufacturing a laminated wood board by laminating an oriented strand board to a strand board, it is possible to manufacture these boards separately and cause them to adhere using adhesive; however, it is preferable to, in the process of collecting the wooden strands to which binder has been applied, collect so as to layer the materials forming the boards in sequence, to apply thermal compression to this collected body, and simultaneously form the boards by thermal compression.

In particular, it is preferable that this laminated wood board possess three layers, wherein surface-smoothed oriented strand boards are employed as the surface layers on both sides, while an oriented strand board, comprising wooden strands having a thickness within a range of 0.4~0.8 mm and having a direction of orientation of the ligneous fibers which is perpendicular to that of the surface layers, is used as the core layer. By means of this, a wood board in which the surface is fine, which is light in weight overall, and which has sufficient strength and rigidity can be obtained.

No particular restriction is made with respect to the thickness of the laminated wood board which is used in the wood board in accordance with the present invention; however, in the case in which this board is to be employed as flooring material, a thickness within a range of 9 mm~15 mm is preferable. When the thickness is less than 9 mm, the strength thereof is insufficient for use as the structural substrate of floorboards, and furthermore, the deflection is inappropriately large. When the thickness is in excess of 15 mm, the thickness becomes excessive for use as a floorboard, and the weight increases and installation becomes difficult, and furthermore, the elasticity which is appropriate for floorboards when a person walks thereon cannot be obtained.

Furthermore, it is preferable that the density thereof be within a range of 0.40~0.65 $g/cm^3$. When the density is less than 0.40 $g/cm^3$, the strength of the wood board is insufficient, while when the density is in excess of 0.65 $g/cm^3$, the overall weight increases, and the board becomes difficult to handle.

The flexural Young's modulus of the laminated wood board should preferably be within a range of 40~80×10$^2$ MPa in the direction of orientation of the surface layer. When the flexural Young's modulus is less than 40×10$^2$ MPa, the deflection when used, for example, as a floorboard, is excessive, while when the flexural Young's modulus is in excess of 80×10$^2$MPa, the appropriate degree of flexibility required for floorboards when a person walks thereon cannot be obtained.

Decorative sheets such as decorative veneers, polyvinyl chloride decorative sheets, and the like, decorative cloths, decorative papers, or the like may be used as the surface decorative material which can be applied to the surface of the wood board in accordance with the present invention.

Decorative veneers which may be employed are not particularly restricted. Veneers which were conventionally employed, such as veneers of Japanese oak, Japanese cypress, teak, walnut, spruce, oak, or the like, having a thickness within a range of 0.2~0.8 mm may be employed. In particular, the surface of the wood board in accordance with the present invention is smoothed, and the wooden strand pattern is concealed, so that even an extremely thin decorative veneer may be employed.

Next, the manufacturing method of the wood board and surface-decorated wood board in accordance with the present invention will be explained.

The processing in which the irregularities of the surface of a laminated wood board, in which the surface layer is formed by an oriented strand board, are filled with putty and smoothed (hereinbelow referred to as "putty processing") may be conducted by means of a manual operation using, for example, a trowel, or the like; however, in view of productivity, the use of a coater is preferable. Various types of coaters may be employed such as a knife coater, a roller coater, or the like; the use of a knife coater is particularly preferable.

Figure 3:
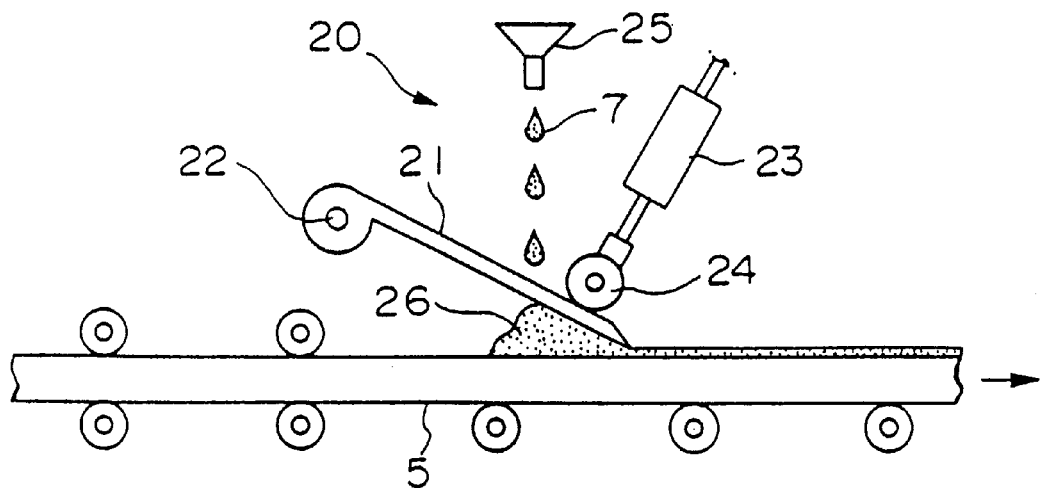
FIG. 3 is a schematic diagram of a knife coater which is employed in the putty processing.

An example of a knife coater which is suitable for the putty processing of the surface of the laminated wood board is shown in FIG. 3. This knife coater is commercially available as, for example, the "Pane Coater" produced by Hashimoto Denki Co., Ltd.

In FIG. 3, the knife coater 20 is provided with a doctor knife 21. This doctor knife 21 has such a length as to cover the entire width of the laminated wood board 5, and the doctor knife 21 is attached in a freely swingable manner by means of a support point 22 so that the blade tip is inclined with respect to the direction of conveyance of the laminated wood board 5 and makes contact with this. This blade tip presses against the surface of the laminated wood board 5 with a constant pressure by means of an oil pressure of a cylinder 23, via a roll 24.

Putty 7 is supplied to a putty bank 26 from a putty tank 25 through an opening of the doctor knife 21, and the putty is continually replenished so as to maintain a constant amount.

The laminated wood board 5 is conveyed in the direction indicated by the arrow in the FIG. 3 by means of conveyance rollers.

This putty processing is commonly carried out for the purpose of smoothing only the side of the wood board which is to become the surface; however, by means of conducting such putty processing on both surfaces of a laminated wood board, it is possible to obtain a wood board in which both surfaces have improved resistance to water and moisture.

Furthermore, if the surface of the oriented strand board which is to be processed is sanded prior to putty processing, the ligneous fibers which project in the form of fuzz are removed, so that the putty penetrates into very small cavities, and a minute filling layer is formed, so that it is possible to obtain a putty layer having superior adhesion, resistance to water, and resistance to moisture.

After putty processing has been conducted, where necessary, the surface may be further sanded. At this time, when the putty surface is to be finished with a specular gloss, an abrasive material having a low grit number is employed, while when a rough surface is desired, in order to improve the adhesion with the surface decorative material, an abrasive material having a high grit number is used.

A common adhesive which is employed in the industry may be employed in order to apply the surface decorative material to the putty surface. Examples thereof include, for example, in the case in which a decorative veneer for flooring is used, a melamine-urea resin adhesive, a rubber-modified melamine-urea resin emulsion adhesive, and the like, while in the case in which polyvinyl chloride color panels are to be used, an ethylene-vinyl acetate resin emulsion adhesive is preferable, and when paper color panels are to be used, a vinyl acetate resin emulsion adhesive or the like is preferable. An aqueous polymeric isocyanate-type resin adhesive is also a preferable adhesive.

Furthermore, after the surface decorative material has been applied in this manner, in order to further improve the gloss of the surface or the strength of the surface-decorated wood board which is obtained, a urethane coating having a thickness within a range of, for example, 40~60 μm, may be applied.

EXAMPLES

Hereinbelow, the present invention will be explained in further detail by means of examples.

Example 1

In FIG. 1, a wood board in accordance with Example 1 is shown. In this wood board 1, the surface irregularities 6 of an oriented strand board 2 in a laminated wood board 5, in which oriented strand boards 2 and 4 are laminated on a strand board 3, are filled with putty and smoothed.

This wood board 5 is produced in the following manner.

First, using a shaving machine (produced by Iwakura Corporation) wooden strands having a length within a range of 20~100 mm, a width within a range of 2~60 mm, and a thickness within a range of 0.15~0.50 mm were produced. 100 parts per weight of the wooden strands were placed in a rotating drum rotating at low speed, and 10 parts per weight of an aqueous phenol binder were applied uniformly to the wooden strands by means of dispersion using a spray as the wooden strands tumbled within the drum, and thus the surface layer formation materials which were to form surface-smoothed oriented strand boards 2 and 4 were obtained.

Using a shaving machine (produced by Iwakura Corporation), wooden strands having a length within a range of 20~100 mm, a width within a range of 2~60 mm, and an average thickness within a range of 0.40~0.80 mm were prepared. 100 parts per weight of these wooden strands were placed in a rotating drum rotating at low speed, and 10 parts per weight of a foaming urethane resin (the crude MDI produced by Sumitomo Bayer Urethane Co., Ltd.) were applied to the wooden strands by means of dispersion using a spray as the strands tumbled within the drum, and thus the formation material for the core layer was obtained. Next, half of the formation materials for the surface layers were dispersed on a thermal compression plate so that the directions of the ligneous fibers thereof were identical, and on this, the formation material for the core layer was dispersed so that the direction of the ligneous fibers was perpendicular to that of the surface layer, and furthermore, on this, the remainder of the formation materials for the surface layers were dispersed so that the direction of the ligneous fibers was identical with that of the previous formation materials for the surface layers, and a collected body having a total thickness of 250 mm was obtained; this was subjected to simultaneous thermal compression and molding for a period of 20 minutes and at a temperature of 160° C. and a pressure of 20 kg/cm², and the laminated wood board 5 was obtained. Irregularities and a wooden strand pattern originating in the wooden strands were found in both surfaces of the laminated wood board 5.

The surface of one of the surface-smoothed oriented strand boards 2 of the laminated wood board 5 was sanded, and the projecting ligneous fibers were removed, and then, the irregularities of this surface were filled with putty using the knife coater shown in FIG. 3, and the surface was smoothed.

The putty 7 which was used therefor was prepared by adding chalk (calcium carbonate powder) to an aqueous polymeric isocyanate-type adhesive so as to attain 40 weight percent of the total solid component, and sufficiently kneading this.

After putty processing, drying was conducted, and the wood board 1 in accordance with Example 1 was obtained.

In the putty-processed surface of this wood board 1, the irregularities were filled with putty and the surface is smoothed, and furthermore, the wooden strand pattern was reduced to such an extent that it was hardly noticeable. Furthermore, the water absorption of the putty-processed surface of this wood board 1 was greatly reduced in comparison with that of the nonprocessed surface on the rear side, and it was confirmed that the resistance to water and moisture thereof were improved. This indicates that by means of conducting putty processing on both surfaces of the wood board having oriented strand boards as the surface layers thereof, the water and moisture resistance of both surfaces of the wood board are improved.

Example 2

Figure 2:
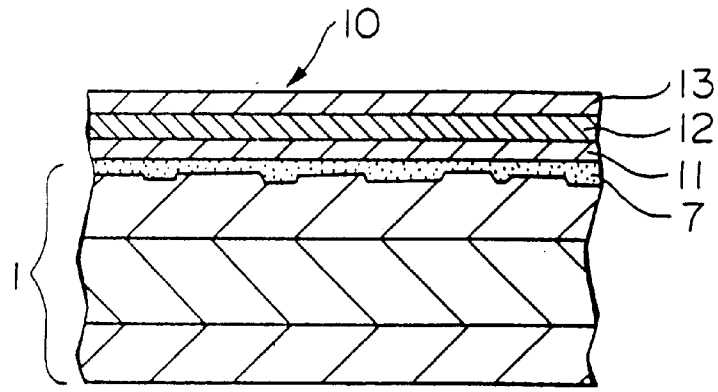
FIG. 2 is a cross sectional view of a surface-decorated wood board in accordance with Example 2.

In FIG. 2, a surface-decorated wood board in accordance with Example 2 is shown. In this surface-decorated wood board 10, a surface-decorative material 12 is applied to the surface of the putty 7 which is formed on the wood board 1 in accordance with Example 1, by means of an adhesive 11, and furthermore, a glossy and protective film 13 is formed on this.

This surface-decorated wood board 10 was produced in the following manner.

The putty surface of wood board 1 was sanded, and next, a rubber-modified melamine-urea resin adhesive was applied to this surface as adhesive 11, and a surface-decorative material 12 comprising an oak veneer having a thickness of 0.3 mm was applied thereto immediately thereafter, and this was subjected to thermal compression for a period of 3 minutes and at a temperature of 110° C. and a pressure of 10 MPa and caused to adhere. Furthermore, after sanding the veneer surface, a urethane coat of approximately 50 μm was applied, forming a glossy and protective film 13, and thus the surface-decorated wood board 10 in accordance with Example 2 was obtained.

The surface of this surface-decorated wood board 10 was extremely smooth, and despite the fact that the surface-decorative material was thin, the wooden strand pattern originating in the wooden strands of the oriented strand board could not be seen. Furthermore, even when this surface was placed in a highly humid environment, swelling or peeling could not be observed in the surface-decorative material 12. This indicates that the putty surface of the wood board 1 and the surface-decorative material were adhered in an extremely fine manner.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by persons of ordinary skill in the art having reference to this description. It is contemplated that all such changes and additional embodiments are within the spirit and true scope of the invention as claimed below.

What is claimed is:

1. A wood board comprising:
   a) a core oriented strand layer made of wood strands;
   b) a surface oriented strand layer, made of wood strands, formed on the core oriented strand layer, the surface oriented strand layer having irregularities thereon; and
   c) a putty layer formed on the surface oriented strand layer to fill the irregularities to provide a smoothed surface thereon, wherein the putty layer comprises a powdered filler material, and an adhesive containing a polymeric isocyanate resin.

2. A wood board according to claim 1, wherein the powdered filler material is about 40 weight percent of a total solid component.

3. A wood board according to claim 2, wherein the powdered filler material is made of calcium carbonate powder.

4. A method of manufacturing a wood board comprising the steps of;
   a) providing a core oriented strand layer made of wood strands;
   b) providing a surface oriented strand layer, made of wood strands, on the core oriented strand layer, the surface oriented strand layer having irregularities thereon; and
   c) providing a putty layer on the surface oriented strand layer to fill the irregularities so as to provide a smoothed surface thereon, wherein the putty layer comprises a powdered filler material, and an adhesive containing an aqueous polymeric isocyanate resin.

5. A wood board according to claim 4, wherein the powdered filler material is about 40 weight percent of a total solid component.

6. A wood board according to claim 5, wherein the powdered filler material is made of calcium carbonate powder.

* * * * *